United States Patent [19]
Nakamura

[11] 4,124,294
[45] Nov. 7, 1978

[54] LIGHT EMISSION REGULATION DEVICE

[76] Inventor: Yoshihiro Nakamura, 86 Futami-cho, Toyokawa-shi, Aichi-ken, Japan

[21] Appl. No.: 642,355

[22] Filed: Dec. 19, 1975

[30] Foreign Application Priority Data

Jan. 16, 1975 [JP] Japan .................................. 50-7567

[51] Int. Cl.² ........................ G03B 27/74; G03B 27/78
[52] U.S. Cl. ........................................ 355/68; 355/69; 355/83
[58] Field of Search ....................... 355/67, 68, 69, 77, 355/83, 132; 315/150, 151

[56] References Cited

U.S. PATENT DOCUMENTS

| | | | |
|---|---|---|---|
| 3,742,295 | 6/1973 | Irie | 355/69 |
| 3,795,444 | 3/1974 | Glidden et al. | 355/68 |
| 3,947,117 | 3/1976 | Basu et al. | 355/68 |
| 3,977,778 | 8/1976 | Seko et al. | 355/68 |

FOREIGN PATENT DOCUMENTS 2,011,106  9/1971  Fed. Rep. of Germany ............. 355/69

*Primary Examiner*—Russell E. Adams
*Attorney, Agent, or Firm*—Wenderoth, Lind & Ponack

[57] ABSTRACT

Light emission regulation device according to which light which is emitted from a light source and is transmitted by an optical system onto a required object or objects is detected by a light detection element which is located externally to the optical system and produces or controls an output which is proportional to light incident on the light detection element and is supplied to a control means which in response controls actuation input to the light source whereby light emission is maintained at a requisite level. The light detection element being external to the optical system, light emission regulation is unaffected by the condition of elements of the optical system or material in the optical path over which light is transmitted.

3 Claims, 7 Drawing Figures

LIGHT EMISSION REGULATION DEVICE

The present invention relates to a device for regulation of light emitted by a light source. More particularly the invention relates to a light regulation device suitable for employment with electrophotocopying equipment.

In many business or industrial applications use is made of a light source the light emitted from which is required to be maintained at a more or less constant level. One example of such an application is a conventional electrophotocopying machine such as shown schematically in FIG. 1. Such a machine comprises a rotatable drum 1 around the outer periphery of which there is provided or formed an electrophotosensitive medium in sheet form and which, in operation to obtain a copy of an original document 3, is rotated at a peripheral speed V in the direction indicated by the arrow $a$ in the drawing. During this rotation successive portions of the drum periphery are carried past a charging unit 2, which imposes an electrical charge on the electrophotosensitive medium constituting the drum surface 1', and then past an exposure station at which successive portions of the drum surface 1' are exposed to image-wise light carrying the image of successive portions of the original document 3, whereby there is formed on the drum surface 1' an electrostatic image of the original document 3. The original document 3 is suitably placed, and held by means not shown, on a horizontal, transparent support 4 which also is moved at a velocity V in the direction indicated by the arrow $b$ in the drawing simultaneously with rotation of the drum 1, during which motion of the support 4 the original document 3 is illuminated from below by light which is emitted from a light source such as a lamp 5 and is directed through the transparent support 4 and onto the original document 3 at a suitable angle by a reflector 6 provided partially around the lamp 5. As the transparent support 4 is moved in the direction $b$ light is reflected from successive portions of the original document 3 and is transmitted along an optical path which is indicated by the letter $d$ in the drawing and extends downwardly to a mirror 7, from the mirror 7 to a mirror 8, from the mirror 8 through a focusing lens 9 to a mirror 10, from the mirror 10 to a mirror 11 and thence to the portions of the drum surface 1' passing the exposure station. Between the mirror 11 and the drum surface 1' there is provided a movable beam restriction plate 12 which may partially block light reflected from the mirror 11 and thereby control the amount of light directed onto the drum surface 1'. The electrostatic image formed on the drum surface 1' is developed by charged toner particles which are directed into contact with the drum surface 1' by a dusting unit 13 and arrange themselves on the drum surface 1' in a pattern corresponding to the image of the original document 3. Simultaneously with movement of the drum 1 and transparent support 4, copy paper 16 is moved at the same velocity V in the direction indicated by the arrow $c$ in the drawing by a forwarding system indicated schematically by rolls 14 and 15 and successive portions thereof are brought into contact with successive developed portions of the drum surface 1' at a transfer station whereat there is provided a discharge unit 17 which causes transfer onto the copy paper 16 of the above-described particles disposed in a pattern on the drum surface 1', whereby the image of the original document 3 is produced on the copy paper 16. As the drum 1 continues to rotate the copy paper 16 is moved out of contact therewith by a detachment means 18 contacting the drum surface 1' and is then directed by suitable transport means through a fixing station 20 including a heater 19, for example, for fixing the image-forming particles in position and then to the exterior of the photocopying machine. Subsequent to detachment therefrom of the copy paper 16 the drum 1 continues to be rotated for a short time in order to bring the exposed surface portions thereof through or to a cleaning station 21 which includes, for example, means for cancellation of electrical charge from the drum surface 1', and brush means for removal of residual particles.

In such an equipment closeness of correspondence of the pattern formed by charged particles on the drum surface 1' to the content of the original document 3, and hence the quality of a copy obtained is dependent on correct exposure of the drum surface 1', and a principal factor controlling exposure of the drum surface 1' is the light emitted by lamp 5. However, in addition to the fact that in normal working conditions the lamp 5 may become dirty, there is deterioration of the lamp 5 after comparatively long use thereof, with the result that emission of light by the lamp 5 does not remain constant, and the quality of copies obtained is varied.

In order to avoid undesired effects of such variation of emission by a light source it is known conventionally to manually effect compensatory movement of the beam restriction plate 12, or to adjust the electrical potential across opposite terminals of the light source by means of manually actuable, external control means. However, since they require manual actuation of various setting means, both these procedures are inconvenient for the user and neither can be guaranteed to effect exactly the correct amount of adjustment of particular elements in the photocopying machine.

According to another conventional method it is known to provide a light detection element in a portion of the optical system by which image-wise light is directed from an original document to the surface of the electrophotosensitive drum, or adjacent to the exposure station whereat the drum surface is exposed to image-wise light. This light detection element produces an output which is proportional to the amount of light impinging on the element and acts to control voltage input to the light source, whereby the amount of light emitted is made proportional to the intensity of light reaching the location of the light detection element. While this method is effective in ensuring that there is a requisite increase of light emission by a light source to compensate for any deterioration of the image-transmission optical system, due to elements of the optical system becoming dirty, for example, there is the disadvantage that since the light detection element is only able to respond to light at a particular point and is incapable of distinguishing causes for variation in light intensity at this point, light emission by the light source is liable to be varied depending on the overall appearance of an original document, i.e., according to whether the original document is generally dark or generally light. Another disadvantage in this method is that blockage of at least a portion of the path over which image-wise light is transmitted is unavoidable.

It is accordingly a principal object of the present invention to provide a means for automatic regulation of light emission from a light source.

It is a further object of the invention to provide a means for automatic regulation of light emission from a light source in which the action of regulation may be unaffected by the condition of other elements which may be associated with the light source.

It is a further object of the invention to provide a light emission regulation method which is particularly suited to a photocopying process and according to which the action of regulation is unaffected by the general appearance of material to be copied.

In accomplishing these and other objects there is provided according to the present invention a means for automatic regulation of light emission by a light source according to which electrical input for actuation of the light source is controlled by a circuit which includes a light detection element receiving light from the light source and acts to maintain light emission at a constant level by increasing electrical input if output from the light source falls below a set reference level. The light detection element may receive light which comes directly from the light source or which is first reflected by a suitable reflector means. According to another embodiment of the invention, the light detection element receives light emitted by a photoemissive diode which is actuated by the same input as the light source. In this embodiment, the control circuit acts to maintain input to the light source at a constant level. In another embodiment, a light detection element receiving light from the light source is included in a servo-control circuit for setting the position of a beam restriction plate which is movable to allow a greater or lesser amount of light emitted by the light source to impinge on an object required to be illuminated, the plate being moved to allow a larger beam of light to pass when emission of light by the light source becomes less.

A better understanding of the present invention may be had from the following full description thereof when read in reference to the attached drawings, in which like numbers refer to like parts, and FIG. 1 is a schematic view of a photocopying machine referred to in the foregoing description;

Figure 1:
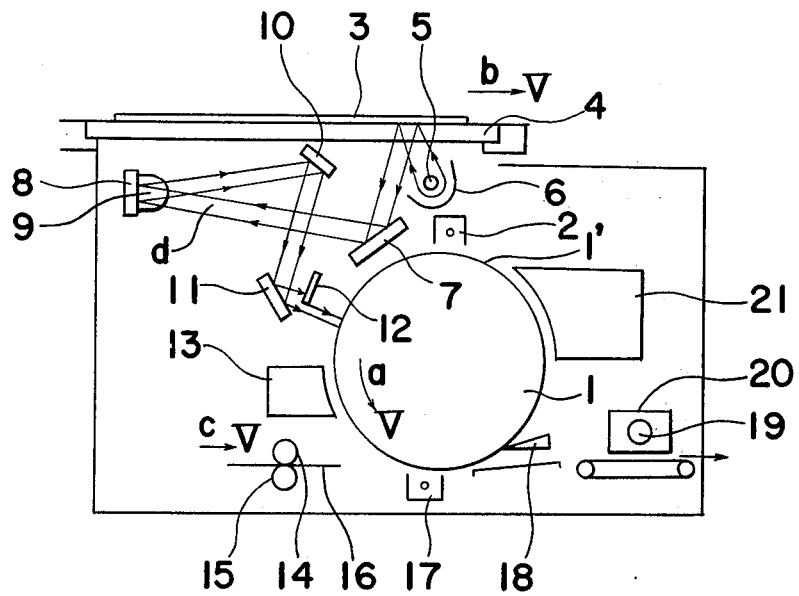
Figure 2:
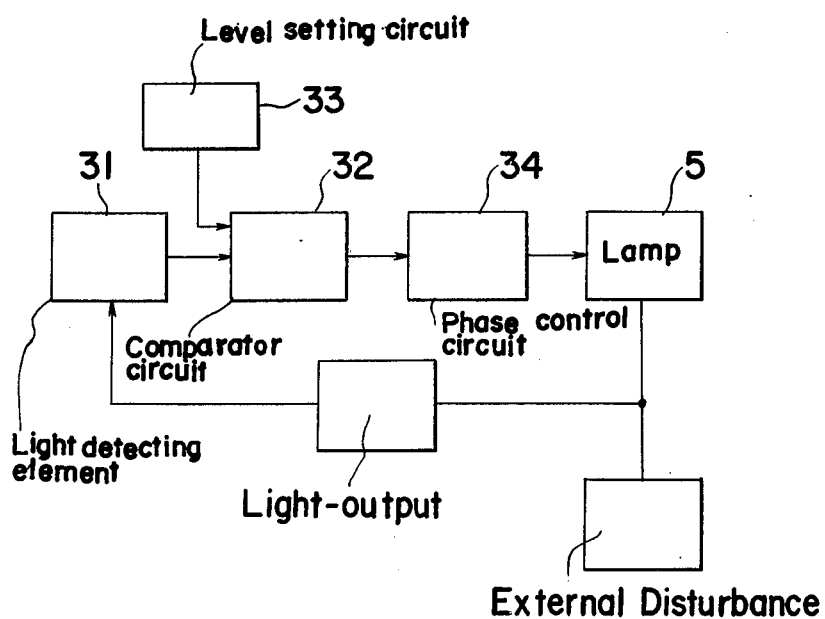
FIG. 2 is a block diagram illustrating principles of light emission stabilization according to one embodiment of the invention.

Referring to the block diagram of FIG. 2, according to a first embodiment of the invention, light emitted by the lamp 5 as shown in FIG. 1 is received by a light detection element 31, such as a CdS cell for example. An electrical output which is produced by or passed through the light detection element 31 and is proportional to the amount of light emitted by the lamp 5 is supplied to a comparator circuit 32 which also receives reference input from a level setting circuit 33, compares these two inputs, and produces an output indicative of the result of this comparison. Output from the comparator circuit 32 is supplied as input to a phase control circuit 34 which in response controls electrical input to the lamp 5, this electrical input being maintained constant, being increased or being decreased according to whether the output from the light detection element 31 is equal to, is less than, or is greater than the reference input supplied to comparator circuit 32 from level setting circuit 33.

Figure 3:
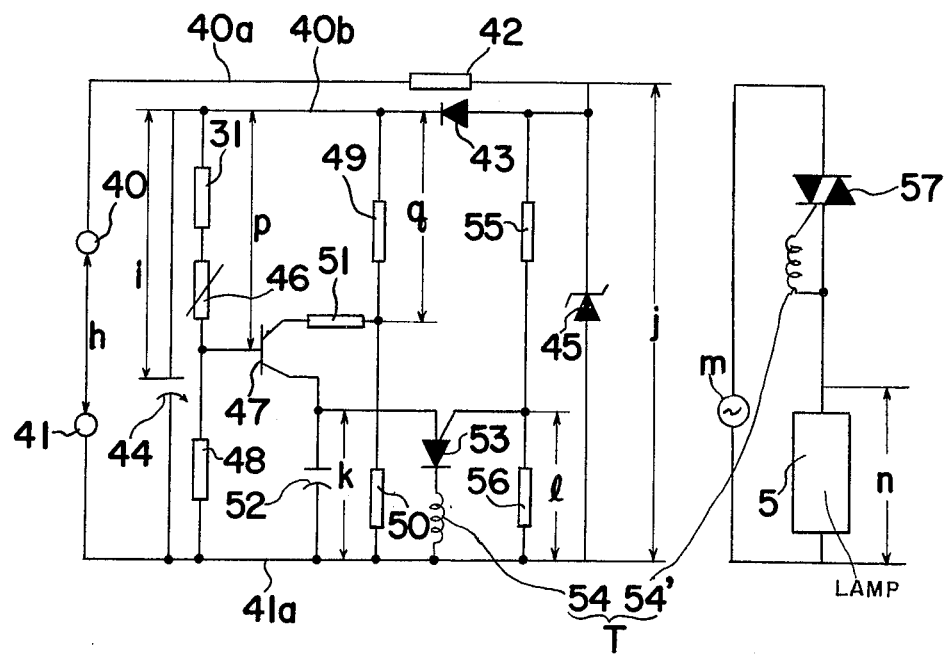
FIG. 3 is a detailed circuit diagram of a circuit embodying the principles shown in FIG. 2.

Action such as described above may be achieved by the circuit shown in FIG. 3 to which reference is now had. Referring to the right-hand side of the drawing, alternating current power $m$ is supplied to the lamp 5 via a circuit including a two-way switching element such as a triac 57 to which a gate input may be supplied by the secondary coil 54' of a triggering transformer T. Since power supply $m$ is AC power, supply of power to the lamp 5 is dependent on a gate signal being supplied to the triac 57 once for each alternation of power supply $m$, and the amount of power supplied to lamp 5 depends on the point in each alternation at which triac 57 is triggered. The primary coil 54 of the transformer for triggering triac 57 is provided in a regulation circuit shown in the left-hand portion of FIG. 3.

Alternating current power which is in phase with and has a frequency which is an integral multiple of the frequency of the power supply $m$ for the lamp circuit receives full-wave rectification to produce a power supply $h$ which is supplied to the regulation circuit across terminals 40 and 41 which connect to a positive line 40a and a negative line 41a respectively. In the line 40a there is connected a resistor 42 and the lines 40a and 41a are connected via a zener diode 45 for voltage regulation. In a line 40b which is parallel to the line 41a and zener diode 45 and connects to the line 41a through a smoothing capacitor 44 there is provided a rectifying diode 43. The remaining elements of the regulation circuit are connected across the lines 40b and 41a.

The light detection element 31 has one terminal connecting to the cathode of diode 43 via line 40b and is in series with a variable resistor 46 and a fixed resistor 48 the end terminal of which connects to line 41a. The light detection element 31 and resistors 46 and 48 are in parallel with a voltage divider comprising resistors 49 and 50 provided in series across lines 40b and 41a, resistor 49 connecting to the cathode of diode 43, and with a voltage divider comprising resistors 55 and 56 which are provided in series across lines 40b and 41a, and connect to opposite terminals of and apply voltage across zener diode 45, resistor 55 connecting to the anode of diode 43.

The junction of variable resistor 46 and fixed resistor 48 connects to the base of transistor 47 the emitter of which connects through a resistor 51 to the junction of resistors 49 and 50 and the collector of which connects to the anode of PUT (programmable unijunction transistor) 53 and to the upper side of a capacitor 52 in parallel with PUT 53. The lower side of capacitor 52 connects to line 41a. The cathode of PUT 53 connects to the above-described primary coil 54 of triggering triac 57 in the power circuit of lamp 5.

Figure 4:
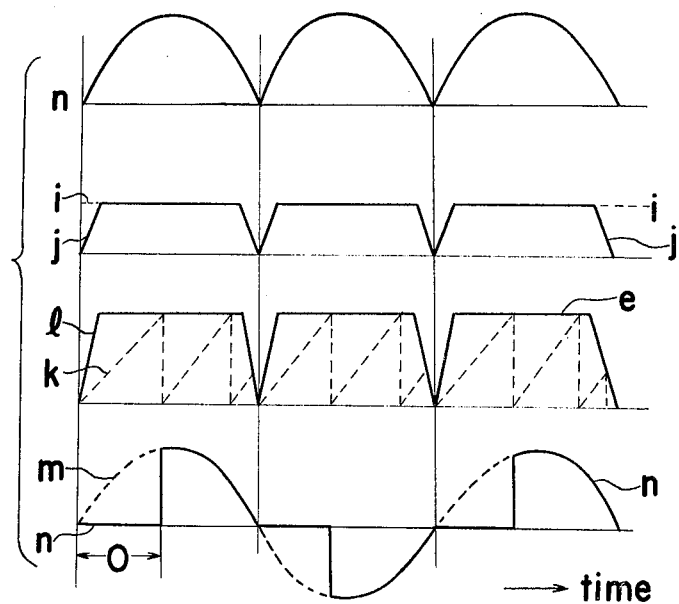
FIG. 4 shows wave-forms present in various parts of the circuit of FIG. 3.

Referring to FIGS. 3 and 4, the action of the above-described circuit is as follows. It is presumed first that output from light by the lamp 5 is at the required level. Voltage applied across zener diode 45 has a trapezoidal waveform shown at $j$ in FIG. 4. The values of the resistance of light detection element 31, variable resistor 46 and 48 through 50 are such that the portion of voltage $i$ passed by diode 43 which is present across opposite terminals of element 31, and resistor 46, and is indicated at $p$ in the drawings, is greater than the voltage $q$ present across opposite terminals of resistor 49. Because of this difference there is a flow of current through resistor 51 and transistor 47 to charge capacitor 52 as indicated by the wave $k$ of FIG. 4. During this process the voltage at the gate of PUT 53 is brought comparatively rapidly to a requisite level $e$ in FIG. 4 to permit PUT 53 to conduct. Therefore when the charge in capacitor 52 reaches the same level as $e$, capacitor 52 discharges, and PUT 53 conducts and remains conductive until gate voltage 1 in FIG. 4 again falls to zero at the end of one cycle of input power supply $h$. The length of the period $O$ extending from the start of a power supply cycle to the time charge $k$ in capacitor 52 reaches the level $e$ is of course mainly dependent on the difference between the above-mentioned voltages $p$ and $q$. As soon as PUT 53 becomes conductive current flows in trigger transformer primary coil 54 thereby producing an induced emf in secondary coil 54' and trigger input to triac 57 which therefore conducts and allows power from power supply $m$ to be supplied to lamp 5. In other words, as indicated by the waveform $n$ in FIG. 4, a certain portion of each alternation of power supply $m$ is not delivered to lamp 5, and the proportion of power supply $m$ which is delivered to lamp 5 is dependent on the duration of period $O$, i.e., the time required for capacitor 52 to reach the charge level $e$, and this in turn is dependent on the setting of variable resistor 46 and the resistance offered by light detection element 31 at a particular level of intensity of light impinging thereon. In other words, presuming lamp 5 functions correctly, supply of a requisite amount of power to lamp 5 in order to achieve emission of light at a certain reference level is easily effected by suitable setting of variable resistor 46, having reference to other values of resistance present in the circuit. At the end of each alternation triac 57 stops conducting since trigger input thereto ceases simultaneously with current therethrough reaching zero, and triac 57 does not become conductive in the next power supply alternation until a period $O$ has elapsed.

Supposing now that for some reason the amount of light emitted by lamp 5 falls below the reference level $e$, the amount of light incident on light detection element 31 decreases, resistance of element 31 increases; and there is an increased voltage drop across the combined resistor constituted by light detection element 31 and variable resistor 46. Consequently voltage at the base of transistor 47 rises, there is an increased flow of current through resistor 51 and the emitter and collector of transistor 47, and capacitor 52 is charged to the value 1 more rapidly, with the result that the period $O$ is made shorter and a greater proportion of power supply $m$ is supplied to lamp 5, thereby compensating for reduced efficiency of lamp 5 or other factors causing reduction of light emission. Thus there is provided a method which requires employment only of compact means which effects automatic regulation of light emitted by a light source.

Although light incident on light detection element 31 reaches the reference level once this compensation is made, and the period $O$ therefore returns to the standard value, after which it is again shortened this process being repeated during actuation of lamp 5, this 'hunting' takes place over a very small range. In practice, taking into consideration factors such as duration of service of the copying equipment and characteristics of the lamp 5, it may be convenient to change the setting of the variable resistor 46, once or periodically, the most suitable amount or times for such adjustment being best determined on a statistical basis.

Figure 5:
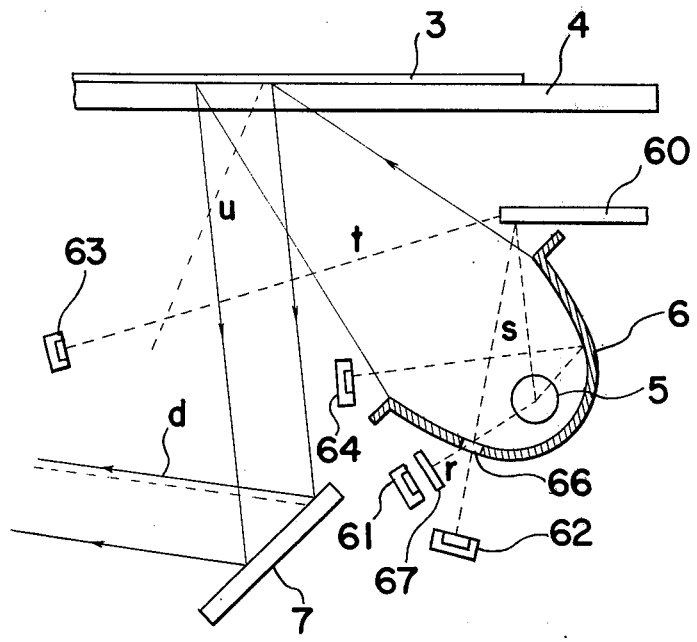
FIG. 5 is a schematic view showing alternative positions for location of a light detection element in a light emission regulation means according to the invention.

Referring now to FIG. 5, there are shown alternative positions 61 through 64 for location of the light detection element 31. When the light detection element 31 is located at position 61, which is behind the reflector 6, i.e. on the opposite side of the reflector 6 from the lamp 5, the element 31 is illuminated directly by light from lamp 5 which passes along a light path $r$ and passes through a small hole 66 formed in the reflector 6, the hole 66 not being large enough to permit passage of an amount of light which is liable to affect exposure of the drum surface 1'. If the amount on light incident of light detection element 31 at position 61, or at any of the other positions 62 through 64, is greater than required for normal functioning of element 31, there may be provided a filter 67 in front of element 31. When light detection element 31 is at position 61, input to the above-described regulation circuit is determined entirely by light emission by lamp 5 and is unaffected by the condition of other elements of the associated equipment.

Position 62 is an alternative position behind the reflector 6 at which light emitted by lamp 5 passes along a light path $s$ and impinges on light detection element 31 after reflection thereof from a reflecting plate 60 provided near lamp 5 and externally to the optical system for direction of light emitted by lamp 5 onto drum 1. In this case, since the reflecting plate 60 can be expected to become soiled to approximately the same degree as photocopying machine elements such as the mirrors for example, after prolonged use of the photocopying equipment, input to lamp 5 is regulated in response to deterioration of reflectance or other qualities of such elements as well as in response to variation in the efficiency of light emission by lamp 5. It is to be noted however, that although this regulation takes into account variation of the quality of different elements of the photocopying equipment, regulation is unaffected by the general appearance of the original document 3 to be copied since light reflected from the document 3 is not received by light detection element 31.

If it is wished to take into account variation of light reflected via transparent support 4 also, photosensitive element 31 may be located at position 63 which is somewhat removed from lamp 5 and is under transparent support 4. In this case, by provision of the reflecting plate 60 for direction of light from lamp 5 along a light path $t$ to light detection element 31, element 31 may be positioned externally to the optical system for transmission of light onto drum 1. Light detection element 31 may also be located at a position 64 whereat most light received thereby is reflected from the reflector 6 and regulation is therefore effected principally in accordance with variation of efficiency of lamp 5, but whereat element 31 also receives light coming indirectly from the light-transmission optical system, whereby regulation is to some extent effected in response to variation in elements of this optical system also.

Figure 6:
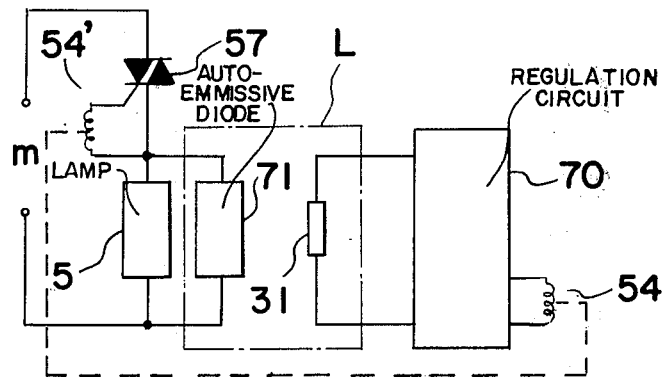
FIGS. 6 and 7 are schematic circuit diagrams of further embodiments of the invention.

FIG. 6 shows another embodiment of the invention according to which light detection element 31 receives light emitted by a photoemissive diode 71. In FIG. 6 the circuit 70 in which light detection element 31 is included has the same circuit configuration as the regulation circuit shown in the left-hand half of FIG. 3, and as in the first embodiment the power supply circuit of lamp 5 includes triac 57 which is triggered by this regulation circuit. Photoemissive diode 71 is connected in parallel to lamp 5 and emits light proportional to the power supply voltage imposed across opposite terminals of lamp 5. Light detection element 31 and photoemissive diode 71 are both enclosed in a single lightproof enclosure L. In this embodiment, if voltage across the lamp 5 terminals falls, there is a decrease in light emission by photoemissive diode 71 and consequent increase of resistance of light detection element 31, with the result that the period 0 preceding triggering of triac 57 in each alternation of supply of power to lamp 5 is shortened in the manner described above.

Figure 7:
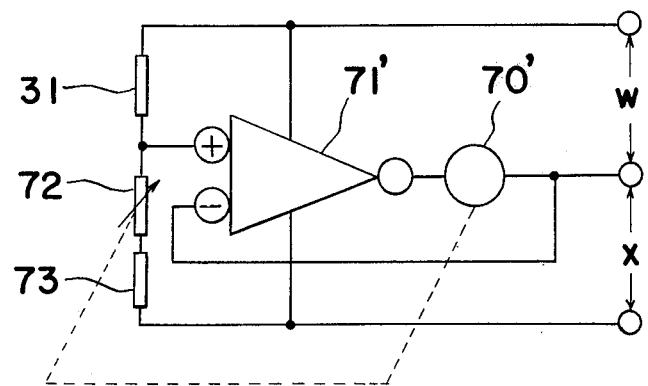

In another embodiment of the invention shown in FIG. 7, light detection element 13 is provided in series with a variable resistor 72 and fixed resistor 73 and together therewith constitutes a voltage divider having a junction connecting to the positive input of a difference amplifier 71'. Output from difference amplifier 71' drives a servo-motor 70' which can move the above-described beam restriction plate 12 shown in FIG. 1 to positions to permit more or less light to reach the drum surface 1', and which when actuated also causes movement of the slider of variable resistor 72. When the positive input to difference amplifier 71' exceeds the negative input thereto, motor 70' is driven in a forward direction, beam restriction plate 12 is moved to allow more light to reach drum surface 1' and the resistance of variable resistor 72 is increased, contrary action being effected when the negative input to difference amplifier 71' exceeds the positive input thereto. Input to the circuit consists of DC inputs $w$ and $x$ which are equal in absolute value but opposite in sign. In this circuit, the relation between the resistance offered by light detection element 31 when light at a reference level of intensity is incident thereon and the combined resistance of fixed resistor 73 and variable resistor 72 at the initial setting of the slider thereof is such that when light emitted by lamp 5 is at the reference level, the potential across opposite terminals of light detection element 31 is equal to the voltage of DC input $w$, and, positive and negative input to difference amplifier 71' being equal, motor 70' remains unactuated and beam restriction plate 12 remains in its initial position. If, however, light emitted by lamp 5 falls below the reference level, there is less light incident on light detection element 31, the resistance of which therefore increases, resulting in an excess of positive input to difference amplifier 71'. Motor 70' is therefore actuated to cause beam restriction plate 12 to move to a position to permit more light to reach drum surface 1', and at the same time increase the resistance of variable resistor 72 whereby current flowing through amplifier 71' is steadily reduced until the requisite amount of light impinges on drum surface 1', at which time motor 70' is stopped. In this embodiment of the invention the light detection element may be located in any of the positions described in reference to FIG. 5.

Needless to say, although in practical equipment in which a single lamp is employed as a light source, light emission regulation generally consists of raising lamp output, the above-described light emission regulation method is equally effective when it is required to lower light emission to a particular level. Also, although the invention has been described in reference to a photocopying machine, it is evident that the method of the invention may be equally well employed in other applications, such as light-actuated counters or flaw detectors employed in mass-production processes for example.

What is claimed is:

1. In a photocopying apparatus including an optical system having at least one light source for forming light rays to illuminate a document to be copied and for transmitting said light rays reflected from the document onto a photosensitive member for forming a latent image of the document upon exposure thereof, and scanning means for providing relative movement between the document and the light source, light emission regulation means for regulating the light emitted from the light source, which light emission regulation means comprises:

a photoemissive element coupled to said light source for emitting light in a quantity proportional to the input voltage supplied to said light source;

a light detection element positioned to receive the light emitted by said photoemissive element for detecting the amount of light emitted by said photoemissive element;

enclosing means for enclosing said photoemissive element and said light detection element in a common lightproof enclosure; and controlling means coupled between said light detection element and said light source for controlling the input voltage to said light source in response to the output of said light detection element; whereby said photoemissive element, light detection element and controlling means providing a substantially constant amount of light from the light source during the time of exposure of the document irrespective of the amount of light reflected from the document.

2. In a photocopying apparatus including an optical system having at least one light source for forming light rays to illuminate a document to be copied and for transmitting said light rays reflected from the document onto a photosensitive member for forming a latent image of the document upon exposure thereof, a light emission regulation means for regulating the light emitted from the light source, which light emission regulation means comprises;

a light detection element for detecting an amount of light emitted directly from said light source, and located in a position outside of the path of said light rays but in a position adapted to detect light directly from the light source for producing an output proportional to the amount of the light incident on said light detection element;

a light restriction member adjacent said light source and movable relative thereto for restricting the amount of light emitted from the light source to the photosensitive means;

actuation means coupled to said light restriction member for moving the light restriction member to different settings for varying the amount of light emitted from the light source; and controlling means coupled between said actuation means and said light detection element for controlling the actuation means in response to output produced by said light detection element.

3. In a photocopying apparatus including an optical system having at least one light source for forming light rays to illuminate a document to be copied and for transmitting said light rays reflected from the document onto a photosensitive member for forming a latent image of the document upon exposure thereof, and scanning means for providing relative movement between the document and the light source, a light-emission regulation means for regulating the light emitted from the light source, which light emission regulation means comprises:

a covering member for enclosing the light source having an opening therein;

a light detection element for detecting an amount of light emitted directly from the light source, and located in position outside of the path of said light rays but in a position for receiving light emitted by said light source and passing through said opening for producing an output proportional to the amount of the light incident on said light detection element; and controlling means coupled between said light detection element and said light source for controlling the input voltage to said light source in response to said output produced by said light detection element for providing a substantially constant amount of light from the light source from the initiation of exposure to termination of the exposure of the document irrespective of the amount of light reflected from the document as said scanning means provides relative movement between said document and said light source.

* * * * *